T. B. HINTGEN.
HALTER.
APPLICATION FILED AUG. 4, 1915.

1,183,974. Patented May 23, 1916.

Witnesses

Inventor
T. B. Hintgen.
By
Attorneys

UNITED STATES PATENT OFFICE.

THEODORE B. HINTGEN, OF DELMONT, SOUTH DAKOTA.

HALTER.

1,183,974.  Specification of Letters Patent.  Patented May 23, 1916.

Application filed August 4, 1915.  Serial No. 43,648.

*To all whom it may concern:*

Be it known that I, THEODORE B. HINTGEN, a citizen of the United States, residing at Delmont, in the county of Douglas, State of South Dakota, have invented certain new and useful Improvements in Halters; and I do hereby declare the following to be a full, clear, and exact description of the invention, such as will enable others skilled in the art to which it appertains to make and use the same.

This invention relates to improvements in halters, and particularly to halters for cattle.

One object of the invention is to provide a halter with a novelly constructed means for leading and at the same time controlling an unruly animal.

Another object is to provide a halter having a combined leading means and a tying means.

Other objects and advantages will be apparent from the following description when taken in connection with the accompanying drawing.

Figure 1:
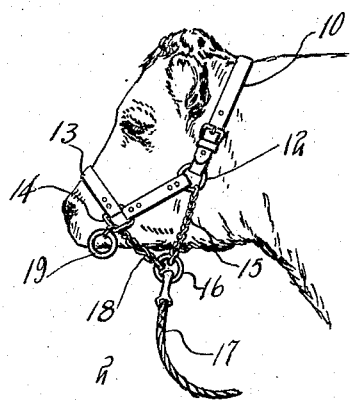
Figure 2:
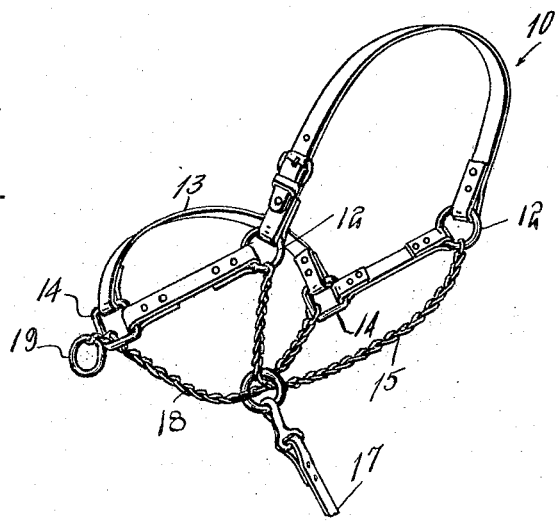
Figure 3:
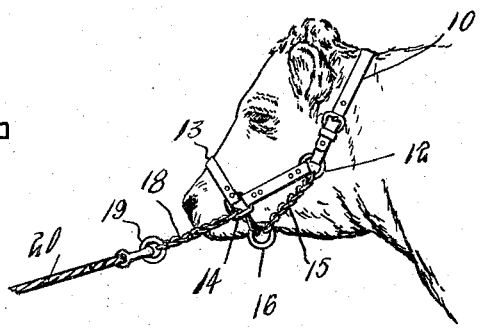

In the drawing: Figure 1 is a side elevation of my improved halter applied to an animal's head, Fig. 2 is a perspective view of the halter removed from the animal, and Fig. 3 is a side elevation of the halter showing the position of the parts when the animal is being led.

Referring particularly to the accompanying drawing, 10 represents the head strap of the halter, 11 the cheek straps connected to the ends of the head straps by means of the rings 12, and 13 the nose strap which is connected at its ends to the remaining ends of the cheek straps by the rings 14. A throat chain 15 passes under the animal's throat and is connected at its ends to the rings 12, said chain passing through a ring 16 disposed below the animal's throat and to which the tie rope 17 is attached. Connected to one of the rings 14 and extending through the rings 16, beneath the animal's throat and through the other ring 14 is a chain 18, the last-named end of which is provided with a ring 19 to which is adapted to be attached the lead rope 20. It will thus be seen that when the animal is tethered by means of the rope 17, the chain 18 will be drawn to a slackened position through the ring 14 until the ring 19 engages with said ring 14. The halter is then, in its action, like an ordinary halter, but when the animal is led by the rope 20 and forward pull exerted on the rope, the chain 18 will be drawn through the ring 14 and press tightly against the animal's throat. This will also act to draw down on the nose strap 13, thus performing the function of a gag or strangler.

Particular attention is called to the fact that the chain 18 serves the double purpose of a chin or throat chain and as a gag or strangler. The chain 18 will be loose when the animal is tied, so that there will be no danger of injury to the head or neck of the animal.

What is claimed is:

An animal halter comprising a head strap, a pair of cheek straps, rings connecting the cheek straps with the head strap, a nose strap, rings connecting the cheek straps with the nose strap, a chain connected at its ends to the first-named rings and arranged to extend loosely beneath the animal's throat, a ring loosely carried by the intermediate portion of the said chain, and a second chain connected to one of the second-named rings and loosely engaged through the loosely carried ring and through the other of the second-named rings for connection to a lead strap.

In testimony whereof, I affix my signature, in the presence of two witnesses.

THEODORE B. HINTGEN.

Witnesses:
 L. E. HOULTON,
 CORA SIMMONS.

Copies of this patent may be obtained for five cents each, by addressing the "Commissioner of Patents, Washington, D. C."